(12) United States Patent
Mürb (10) Patent No.: US 7,874,823 B2
(45) Date of Patent: Jan. 25, 2011

(54) DEVICE AND PROCESS FOR PRODUCING PELLETS FROM A PLASTIC MELT

(75) Inventor: Reinhardt-Karsten Mürb, Aschaffenburg (DE)

(73) Assignee: Rieter Automatik GmbH, Grobostheim (DE)

( * ) Notice: Subject to any disclaimer, the term of this patent is extended or adjusted under 35 U.S.C. 154(b) by 268 days.

(21) Appl. No.: 12/227,229

(22) PCT Filed: Apr. 27, 2007

(86) PCT No.: PCT/EP2007/003780

§ 371 (c)(1),
(2), (4) Date: Nov. 12, 2008

(87) PCT Pub. No.: WO2007/131613

PCT Pub. Date: Nov. 22, 2007

(65) Prior Publication Data

US 2009/0091054 A1    Apr. 9, 2009

(30) Foreign Application Priority Data

May 15, 2006    (DE) ........................ 10 2006 022 555

(51) Int. Cl.
*B29B 9/06* (2006.01)
*B26D 1/143* (2006.01)

(52) U.S. Cl. ........................ 425/67; 264/14; 264/180; 425/317

(58) Field of Classification Search ................. 425/317, 425/67; 264/14, 180, 142, 211.13
See application file for complete search history.

(56) References Cited

U.S. PATENT DOCUMENTS 4,721,588 A    1/1988    Burchard et al.

(Continued)

FOREIGN PATENT DOCUMENTS

DE    1915950    12/1969

(Continued)

*Primary Examiner*—Philip C Tucker
*Assistant Examiner*—Alison Hindenlang
(74) *Attorney, Agent, or Firm*—Birch, Stewart, Kolasch & Birch, LLP (57) ABSTRACT

The invention relates to a device for producing pellets from a plastic melt by extrusion, comprising a perforated plate from which the plastic melt is extruded at a pressure above the ambient pressure; a process chamber into which the plastic melt is extruded; a chopping device for chopping strands of the plastic melt extruded from the perforated plate into individual granules, the process chamber being filled with a process fluid; and a pumping device which supplies the process fluid to the process chamber at a pressure above the ambient pressure, the pressure of the process fluid with the therein contained granules being reduced downstream of the process chamber. According to the invention, an energy converter is provided downstream of the process chamber, wherein said energy converter extracts at least some of the pressure energy from the process fluid with the therein contained granules, reduces the pressure of the process fluid with the therein contained granules and converts at least some of the extracted energy into a reusable form of energy. The invention further relates to a corresponding process for producing pellets from a plastic melt by extrusion and also to a corresponding application.

20 Claims, 5 Drawing Sheets

U.S. PATENT DOCUMENTS

| | | |
|---|---|---|
| 2005/0154183 A1 | 7/2005 | Ekart et al. |
| 2005/0156344 A1 | 7/2005 | Dietzen et al. |
| 2007/0080476 A1 | 4/2007 | Tsai et al. |
| 2009/0108480 A1 * | 4/2009 | Schmaus et al. .............. 264/12 |

FOREIGN PATENT DOCUMENTS

| | | |
|---|---|---|
| DE | 4337205 A1 | 5/1995 |
| DE | 10226749 A1 | 12/2003 |
| DE | 10358805 A1 | 7/2005 |
| EP | 0249157 A1 | 12/1987 |
| EP | 1522395 A2 | 4/2005 |
| EP | 1621310 A1 | 2/2006 |

* cited by examiner

Fig. 1

Fig. 2    Detail A a)

b)

c)

Fig. 3    Detail B a)

DEVICE AND PROCESS FOR PRODUCING PELLETS FROM A PLASTIC MELT

The invention relates to a device for producing pellets from a plastic melt according to the preamble of claim 1, to a corresponding process according to the preamble of claim 11 and to an application according to claim 13.

An area of application for the production of pellets from molten plastics by extrusion according to the invention relates, for example, to the use of an underwater hot-face process, but is not limited thereto.

Another area of application for the production of pellets from molten plastics by extrusion according to the invention is, for example, the production of granules by dropletizing of molten plastics, wherein a process chamber is filled with pressurized gas and is provided in the lower region with a liquid bath for collecting the granules, with a pressurized process fluid. A melt of plastic material is forced through a perforated plate in the upper region of the process chamber, whereupon, under the influence of surface tension and/or through the action of vibrations or other stresses, the issuing, as it were, "extruded" strands of the plastic melt disaggregate into a chain of droplets, similarly as in a chopping device, wherein, under the influence of the gas, which may serve also as a coolant, and/or through immersion in the process fluid, said droplets solidify by cooling or other reactions.

In the underwater hot-face process, a plastic melt is pressed through a plate provided with holes, a so-called perforated plate. Typically, the holes are arranged in one or more circles of holes or in an annular pattern, the respective centre point being aligned with a drive shaft of a cutter arrangement of a chopping device. The issuing plastic strands are chopped into small fragments by the cutter arrangement, which runs more or less directly on the surface of the perforated plate. By means of a process fluid, usually process water, which is delivered with the cutters, said fragments are then removed from the site of their production in a process chamber, there taking place intensive cooling and, therefore, solidification of the chopped fragments. The pellets thus produced, for example, by the underwater hot-face or dropletization process are transported out of the process chamber by the process fluid and are conventionally supplied through pipes to a separation device in which, given sufficient holding time, the pellets are separated from the process fluid and are subsequently supplied to a drying unit.

Usually, as a consequence of the geometry of the inlet and outlet of the process fluid to and from the process chamber and/or as a consequence of the cutter arrangement and the shaft for moving the cutter arrangement, a coaxial vortex is normally produced in the housing of such a device, more particularly about the rotation axis of the cutter arrangement, i.e. about the shaft, there being an area of reduced pressure at the centre of such vortex. If the central pressure falls below a critical value, which depends also on other process parameters, this may lead to outgassing and vaporization of the process fluid, this resulting, on account of corresponding vapour bubbles, in considerably diminished transport and cooling properties of the process fluid. This gives rise to a significant deterioration in the reliable operation of a prior-art underwater hot-face or dropletization system. Furthermore, if a vapour bubble occurs directly at the perforated plate, this may result, because of the thereby reduced cooling, in agglutination and gumming-up of the openings of the circle of holes by the plastic melt, which can lead, in the worst case, to a complete stoppage in the production of plastic pellets.

It is possible—for example by reducing the cross-section of the pipes for the inlet and outlet of the process fluid to and from the process chamber or by exploiting a certain geodetic height of a column of the process fluid by means of appropriate arrangement of the device—to generate a higher back-pressure of the process fluid in the process chamber, which will counteract the formation of a vacuum—and in the worst case—of vapour bubbles in the process fluid there. However, such prior-art solutions give rise to other serious disadvantages. For instance, especially in the case of pipes of small cross-section, there may, particularly at the start of a production run, be agglomerations of granules, since those process parameters that are required for a smooth operation process cannot be achieved immediately upon startup of the device. Such agglomerations easily lead to obstructions in the outgoing pipe and can therefore result in a complete stoppage of the production process. In practice, it has been demonstrated that, depending on the pellets, size of system and type of plastic material being processed, the inside diameter of the pipe should not be less than 25 to 40 mm. If use is made of sufficiently wide and/or particularly long pipes (e.g. in order to exploit a certain geodetic height of a column of the process fluid), this may, in turn, have the disadvantage that there is a corresponding increase in the holding time of the pellets in the process fluid, which may therefore possibly result in too great a cooling effect. The undesirable consequence thereof is to prevent the possibility of using the inherent heat of the pellets for the drying thereof, with the result that the energy required for drying must be additionally supplied at corresponding cost. Moreover, in the case of some plastic materials, this suppresses desired crystallization processes, this resulting in additional process steps and necessitating considerable further technical and financial expenditure.

If one were simply to increase the flow of the process fluid, i.e. the flow rate thereof, although reducing the holding time, this measure would, in turn, give rise to the occurrence of the above-mentioned central bubble, because the vacuum produced at the centre increases approximately with the square of the rotational speed of the process fluid in a vortex, it then being possible for the central bubble to form. The influence of the flow rate of the process fluid is further amplified by the rotational speed of the cutters of a chopping device.

There are squeeze valves, already locally limited in their application in the prior art, which are capable of effecting a sufficient increase in pressure through a locally limited reduction of the cross-section in the outgoing pipe if the inner width of the squeezing gap is of or below the order of magnitude of the produced pellet diameter. However, such squeeze valves harbour the great risk of, or lead in any case to, an obstruction of the outgoing pipe, something which, of course, is not desirable.

A further application for a device or process for producing pellets from a plastic melt by extrusion according to the invention relates to systems which process plastic melts containing substances which, under the conditions prevailing during discharge from the holes in the perforated plate, would outgas out of the plastic melt if the ambient pressure were not high enough. Such attendant substances in the melt may, in the simplest case, be water, which may be contained in the plastic material. However, these may also be functional substances, such as flame retardants, propellants for foamable plastics or desired or undesired reaction products of the plastic melt itself. As a consequence of a required increase in the pressure in the process chamber and in the downstream outgoing pipe system, such substances remain dissolved in the plastic melt until, as a result of the cooling effect that occurs on account of the process fluid, the plastic melt has solidified to such an extent that the outgassing, and therefore swelling, of the produced plastic-melt pellets is effectively suppressed.

Known from document EP 1 522 395 A2 is a process and device for the thermal crystallization of a molten polyester polymer in a fluid wherein, having been extruded from a perforated plate and chopped by a chopping device, the strands of the corresponding plastic melt are chopped into individual granules which reside for a certain time in a pressurized process fluid, the granules being separated from the pressurized process fluid by a separation device.

It is therefore an object of the present invention to provide a device, process and corresponding application for producing pellets from a plastic melt, said device, process and application overcoming the disadvantages associated with the prior art and, more particularly, to provide a device, process and application which, in relatively simple, energy-saving and, therefore, cost-effective manner, permit the safe and reliable production of pellets under essentially all operating conditions.

The object of the invention is achieved by a device having the features according to claim 1, by a process having the features according to claim 11 and by an application having the features according to claim 13. Further embodiments of the invention are defined in the respective subclaims.

The device according to the invention for producing pellets from a plastic melt by extrusion comprises a perforated plate from which the plastic melt is extruded at a pressure above the ambient pressure; a process chamber into which the plastic melt is extruded; a chopping device for chopping strands of the plastic melt extruded from the perforated plate into individual granules, the process chamber being filled with a process fluid; and a pumping device which supplies the process fluid to the process chamber at a pressure above the ambient pressure, the pressure of the process fluid with the therein contained granules being reduced downstream of the process chamber. Contrary to the device known, for example, from the aforementioned EP 1 522 395 A2, therefore, according to the invention the pressure of the process fluid together with the therein contained granules is reduced, it not being the case, as described in the aforementioned publication, that first the pressure of the process fluid itself is reduced, whereupon only thereafter are the granules removed from the system. Further provided according to the invention is an energy converter provided downstream of the process chamber, wherein said energy converter extracts at least some of the pressure energy from the process fluid with the therein contained granules, reduces the pressure of the process fluid with the therein contained granules and converts at least some of the extracted energy into a reusable form of energy. An area of application for the production of pellets from molten plastics by extrusion according to the invention relates, for example, to the use of an underwater hot-face process or, alternatively, for example, to the production of granules by dropletization of molten plastics.

The invention is based, in particular, on the following consideration, that pressure, too, constitutes a certain form of energy, where the energy E contained in a volume element V at pressure p is calculated as $E=p\times V$. According to the invention, at least some of this pressure energy is extracted by the energy converter according to the invention and is converted into another, reusable form of energy. Contrary to the above-described prior art, therefore, the use of the energy converter according to the invention makes it possible, in simple and cost-effective manner, to ensure the safe and reliable production of pellets under all operating conditions. In particular, a sufficient pressure can always been made available, despite which, according to the invention, at least some of the extracted energy is or can be actively converted downstream of a process chamber into a reusable form of energy.

The generation of a backpressure as in the prior art, as was described hereinbefore—namely, for example, through the use of narrowed pipe cross-sections, local constrictions in the form of nozzles or through geodetic height differences in a system which produce a fluid column pressure—is, by contrast, as explained hereinbefore, not only passive, i.e. difficult or impossible to adjust to different process parameters, but is also not totally safe and reliable under all operating conditions. Furthermore, the prior-art solutions, such as different geodetic heights of the elements of a system, can in some cases only be realized with very great constructional effort. By contrast, the device according to the invention offers all the hereinbefore-described advantages, because the pressure energy can be actively reduced by the energy converter according to the invention and can be converted into a reusable form of energy.

Momentum energy is particularly advantageous as a reusable form of energy.

The energy converter according to the invention may be, for example, a turbine. A turbine is, by general definition, a machine that converts the kinetic and pressure energy of a moving fluid into mechanically usable energy, e.g. in the form of torque. The general counterparts thereto are, for example, piston engines or displacement machines, such as the driving cylinders of steam engines, in which the kinetic energy of the moving fluid plays only a subordinate role with regard to energy conversion. Thus, according to the invention, in the case of a turbine, the kinetic energy of the process fluid can thereby be actively converted into an angular momentum, where the corresponding inlet guide vanes and impeller blades of such a turbine can be so arranged that the momentum inherent in the process fluid with the therein contained granules is converted into an angular momentum of the impeller. The thus driven impeller of the turbine can then be transmitted via a shaft to a drive or output unit which is capable, for example, of driving an electric generator. Consequently, a turbine arrangement according to the invention dispenses with the need to select particularly narrow pipe cross-sections in order to build up a required backpressure.

The energy converter according to the invention may also be in the form of a flexible-tube pump with reverse energy flow direction. Generally, flexible-tube pumps are counted among the displacement machines in terms of their characteristics.

Such a flexible-tube pump with reverse energy flow direction is based on the principle that a flexible tube is pinched off completely or up to a certain extent, the pinched-off portion being moved further along the tube. Depending on the speed of movement of the pinched-off portion and the cross-section of the rest of the tube, therefore, a precisely predeterminable volumetric flow rate is permitted. A predetermined quantity of energy is released by the pressure upstream of the pinched-off portion using the formula work=force×distance, where the work corresponds to a certain quantity of energy. The same consideration applies if, instead of a linear movement of the pinched-off portion, there is a circular movement, as may be provided according to the invention by a flexible-tube pump arrangement with reverse energy flow direction.

Flexible-tube pumps in the conventional sense, i.e. without reverse energy flow direction as in the invention, operate in such a manner that a motor drives a shaft on which two or more pinch shoes or pinch rollers compress a tube supported on the inside of a cylinder segment, the contents of the tube being permanently pushed forward by the rotational movement of the shaft. First of all, the driving energy of the motor is converted into a rotational movement which, in turn, sets in flow the fluid that is to be transported in the tube, with a certain application of pressure to the fluid that is to be transported. This is where the invention makes precisely opposite use of a flexible-tube pump, i.e. according to the invention, the application of pressure to the process fluid with the therein contained granules in the flexible-tube pump causes a corresponding rotational movement which can be picked off at an output shaft and be reused. For example, the output shaft may be fitted with an electric generator, it additionally being possible, as also in the case of a turbine or in the case of other conceivable energy converters according to the invention, to provide a frequency converter with braking resistor or an electric energy-recovery unit.

A flexible-tube pump with reverse energy flow direction according to the invention is relatively insensitive with regard to obstructions, because at no point, except in the region of the advancing pinched-off portions, is the inside width of the tube seriously constricted. The pinched-off portions migrate with the pinch device along the tube and open again completely at the end of the delivery inflow, with the result that there is no agglomeration or, consequently, obstruction with pellet particles by reason of the absence of contact pressure of adhesion of the particles to the tube or any similar possibility of blockage.

Generally, according to the invention, the volumetric flow rate of the process fluid with the therein contained pellets can be controlled with regard to the adjusted volumetric flow rate and with regard to the thus generated pressure, wherein the delivery characteristics of the pumping device according to the invention with regard to the generated pressure from said volumetric flow rate are exploited in order to monitor a constancy of the energy flow through suitable adjustment of the drive thereof.

According to the invention, a pipe for the process fluid has a damping element for damping and compensating pulsations, having preferably an air chamber.

The energy converter according to the invention may also be a gear pump with reverse energy flow direction, wherein the energy inherent in the process fluid with the therein contained pellets is extracted relatively simply in suitable manner through conversion of the corresponding momentum into an angular momentum. Generally, gear pumps are counted among the displacement machines in terms of their characteristics.

Generally, suitable energy converters according to the invention may also, in terms of their design, be based on known centrifugal pumps, radial pumps, diagonal pumps or axial pumps.

The principle of energy conversion according to the invention may be based on the fact that the process fluid with the therein contained granules is conducted into a housing similar, for example, to a conventional centrifugal-pump housing, the process fluid being set, if necessary with the assistance of inlet guide vanes, in a rotational movement relative to the axis of an impeller. The kinetic energy of the process fluid with the therein contained granules is thereby converted into an angular momentum. The angular momentum is then transmitted to an impeller.

The device according to the invention may have essentially no stationary constriction of a flow cross-section downstream of the process chamber, i.e. there is no permanently stationary constriction. Consequently, it will always be possible for the available inside width between corresponding components to be greater than a critical size of agglomerations that may occur and are to be expected under certain operating conditions, such as at the startup of a production process, with the result that, in a particularly preferred embodiment, blockages of the device can be prevented.

In particular, the design of housings, inlet guide vanes and impellers as well as of other elements of the energy converter according to the intervention as hereinbefore described in preferred embodiments, will have an influence on the prevention of blockages of the device, wherein the provision of the energy converter according to the invention makes this simple and cost-effective to achieve in comparison with the prior art as initially described.

According to the invention, an energy-recovery device may be provided by means of which the extracted and converted energy can be recovered to the pumping device. In addition to exclusively electric energy recovery, it is also possible to provide mechanical or hydraulic energy recovery. At any rate, the energy balance of the overall device is thereby significantly improved. In the theoretical energy balance, the energy that can be extracted by the energy converter is just as great as the energy previously required to build up the pressure by the pumping device, because, in practice, it is necessary to take account of hydraulic, mechanical and other losses, it having to be considered that the efficiency of the pumps, turbines and similar equipment preferably provided according to the invention will not be 100% and is, moreover, also dependent on the rotational speed. Consequently, in the case of the energy-recovery device provided according to the invention, intermediate gear drives may under certain circumstances have an influence on the overall efficiency, i.e. they may, to a certain extent, either improve or worsen the overall efficiency.

As already indicated, the energy-recovery device may provide for mechanical, electrical, pneumatic or hydraulic energy recovery or a combination thereof.

According to the invention, the energy-recovery device is connected to the energy converter according to the invention, wherein, in turn, the energy-recovery device may be connected to a further pumping device additional to the hereinbefore-described actual pumping device, this making it possible to compensate for hydraulic and any other losses in the overall device.

According to the invention, a control loop may be provided by means of which the pressure in the process chamber is adjustable such that said pressure is slightly above, preferably just above, the pressure at which the process fluid evaporates at the prevailing temperature. This offers the advantage that extrusion can take place with minimal stressing of the material and, consequently, with particular reliability, especially where highly volatile process fluid is employed.

According to the invention, it is also possible to provide a control loop, more particularly the same control loop as described in the preceding paragraph, by means of which the pressure in the process chamber is adjustable such that said pressure is slightly above, preferably just above, the pressure at which attendant substances contained in the plastic melt evaporate at the prevailing temperature. This offers the further advantage that extrusion can take place with minimal stressing of the material and, consequently, with particular reliability, especially where a plastic melt with highly volatile attendant substances is employed.

According to an embodiment of the invention, the control loop may be so connected (or not be connected) to the energy converter and/or optionally also to the energy-recovery device as to provide the possibility of corresponding closed-loop/open-loop control.

The process according to the invention serves to produce pellets from a plastic melt by extrusion. An area of application for the production of pellets from molten plastics by extrusion according to the invention relates, for example, to the use of an underwater hot-face process or, alternatively, for example, to the production of granules by dropletization of molten plastics. In the process according to the invention, a plastic melt is produced, the plastic melt being extruded at a pressure above the ambient pressure through a perforated plate into a process chamber filled with a process fluid. The strands of the plastic melt extruded from the perforated plate are chopped into individual granules, use being made in a particularly preferred embodiment of a chopping device, wherein, according to the invention, a pumping device supplies the process fluid to the process chamber at a pressure above the ambient pressure. The pressure of the process fluid with the therein contained granules is reduced downstream of the process chamber. According to the invention, at least some of the pressure energy is extracted from the process fluid with the therein contained granules by an energy converter provided downstream of the process chamber, the pressure of the process fluid with the therein contained granules being reduced and at least some of the extracted energy being converted into a reusable form of energy.

The statements made hereinbefore in connection with the device according to the invention also apply accordingly, insofar as applicable, to the process according to the invention.

In the process according to the invention, the extracted and converted energy may be recovered to the pumping device through an energy-recovery device, as has likewise already been explained hereinbefore in connection with the device according to the invention.

According to the invention, a device for producing pellets from a plastic melt with the hereinbefore-described features and/or a process for producing pellets from a plastic melt with the hereinbefore-described features finds application in the processing of a plastic melt with attendant substances, which attendant substances will outgas unless there is a sufficient pressure above the ambient pressure in a melt supply arrangement and/or in the process chamber. Preferably, the plastic melt with attendant substances is expanded polystyrene (EPS).

Hereinbelow, the invention will be more fully explained on the basis of preferred illustrative embodiments with reference to the appended drawings, in which:

FIGS. 3a and b show two different embodiments of detail B from FIG. 1.

Figure 1:
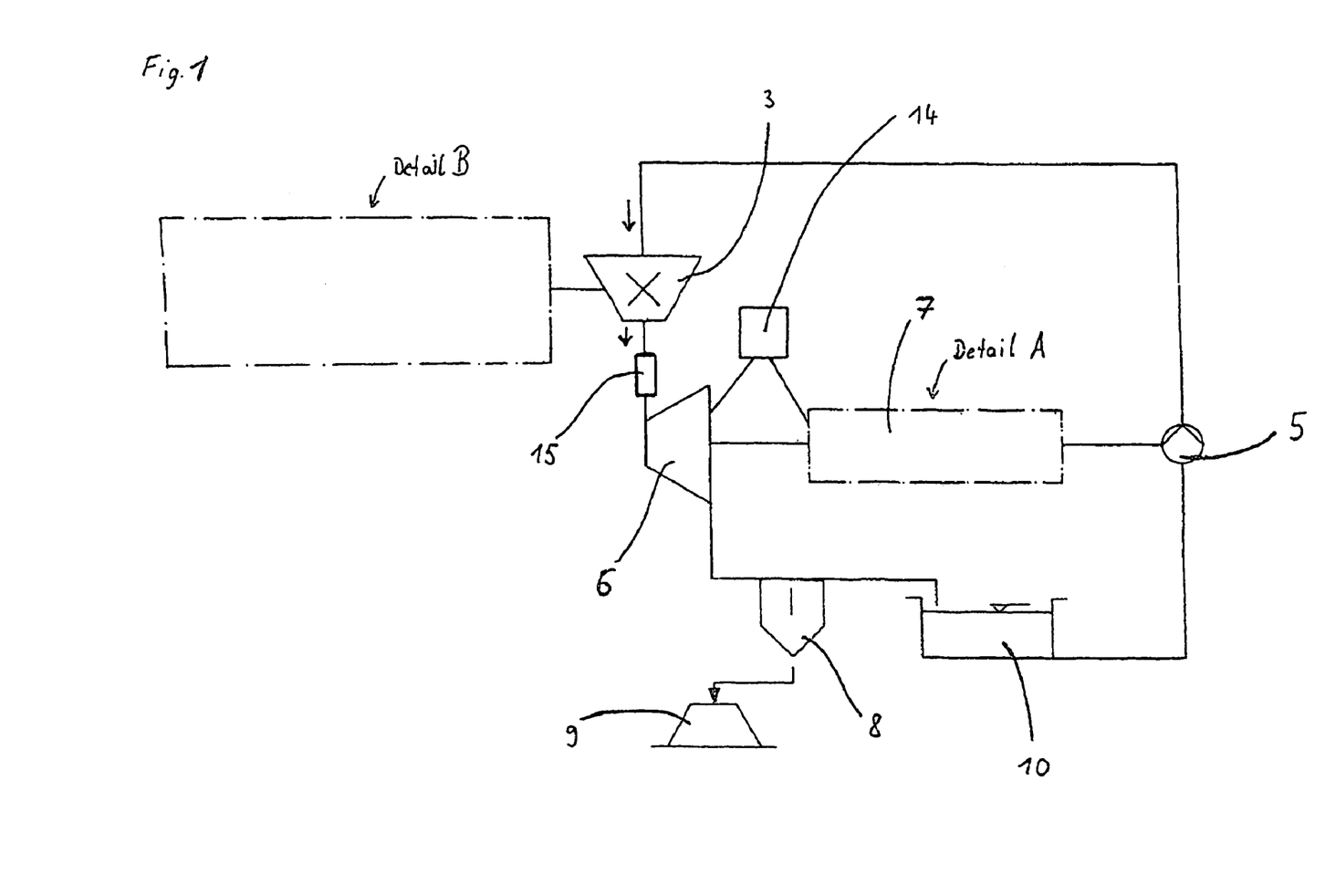
FIG. 1 shows a diagrammatic view of a system set-up with a device according to the invention.

FIG. 1 shows a diagrammatic representation of a system set-up with a device for producing pellets according to an embodiment of the invention.

By means of a plastic-melt supply arrangement, which is reproduced by detail B in FIG. 1, where detail B will be explained in still further detail with reference to FIG. 3, a plastic melt that is to be pelletized is supplied to the pelletization site, namely to the chopping device identified by reference character 3 in FIG. 1.

An embodiment of said chopping device 3 will be explained in still further detail with reference to FIG. 7. Having been chopped into individual granules by or in the chopping device 3, the plastic melt then finds itself in a process fluid 4 (not explicitly shown in FIG. 1), merely the flow direction of the process fluid being indicated by arrows, wherein the process fluid is supplied at a pressure above the ambient pressure by an upstream pumping device 5, usually a pump, to a process chamber 2 (not shown in FIG. 1) or to the chopping device 3. According to the invention, provided downstream of the process chamber or chopping device 3 is an energy converter 6 which extracts at least some of the pressure energy from the process fluid with the therein contained granules, reducing the pressure of the process fluid with the therein contained granules and converting at least some of the extracted energy into a reusable form of energy. The energy converter 6 may be preferably a turbine, a flexible-tube pump with reverse energy flow direction or a gear pump with reverse energy flow direction. According to the invention, a pipe for the process fluid may, as shown in FIG. 1, be provided with a damping element 15 for damping and compensating pulsations, being provided preferably with an air chamber. After pressure energy has been extracted according to the invention by the energy converter 6 from the process fluid with the therein contained granules, the process fluid with the therein contained granules is supplied to a separator 8 in which the process fluid is separated from the granules. The granules are then delivered to a store 9 for separated pellets. The process fluid 4 is collected in a container 10 for process fluid and is returned to a pumping circuit, wherein, according to FIG. 1, the suction side of the pumping device 5 is fluidically connected to the container 10. There may be provided a control loop 14 by means of which the pressure in the process chamber 2 is adjustable such that said pressure is slightly above, preferably just above, the pressure at which the process fluid evaporates at the prevailing temperature and/or such that said pressure is slightly above, preferably just above, the pressure at which attendant substances contained in the plastic melt evaporate at the prevailing temperature. According to the embodiment of the invention presented in FIG. 1, the control loop 14 is so connected to the energy converter 6 and/or optionally to an energy-recovery device 7 as to allow a corresponding closed-loop/open-loop control. Detail A in FIG. 1 identifies the energy-recovery device 7, which provides for the energy reusably converted by the energy converter 6 according to the invention to be recovered in order to operate the device, more particularly in order to drive the pumping device 5.

Detail A will now be explained in greater detail with reference to FIGS. 2a to 2c.

Figure 2:
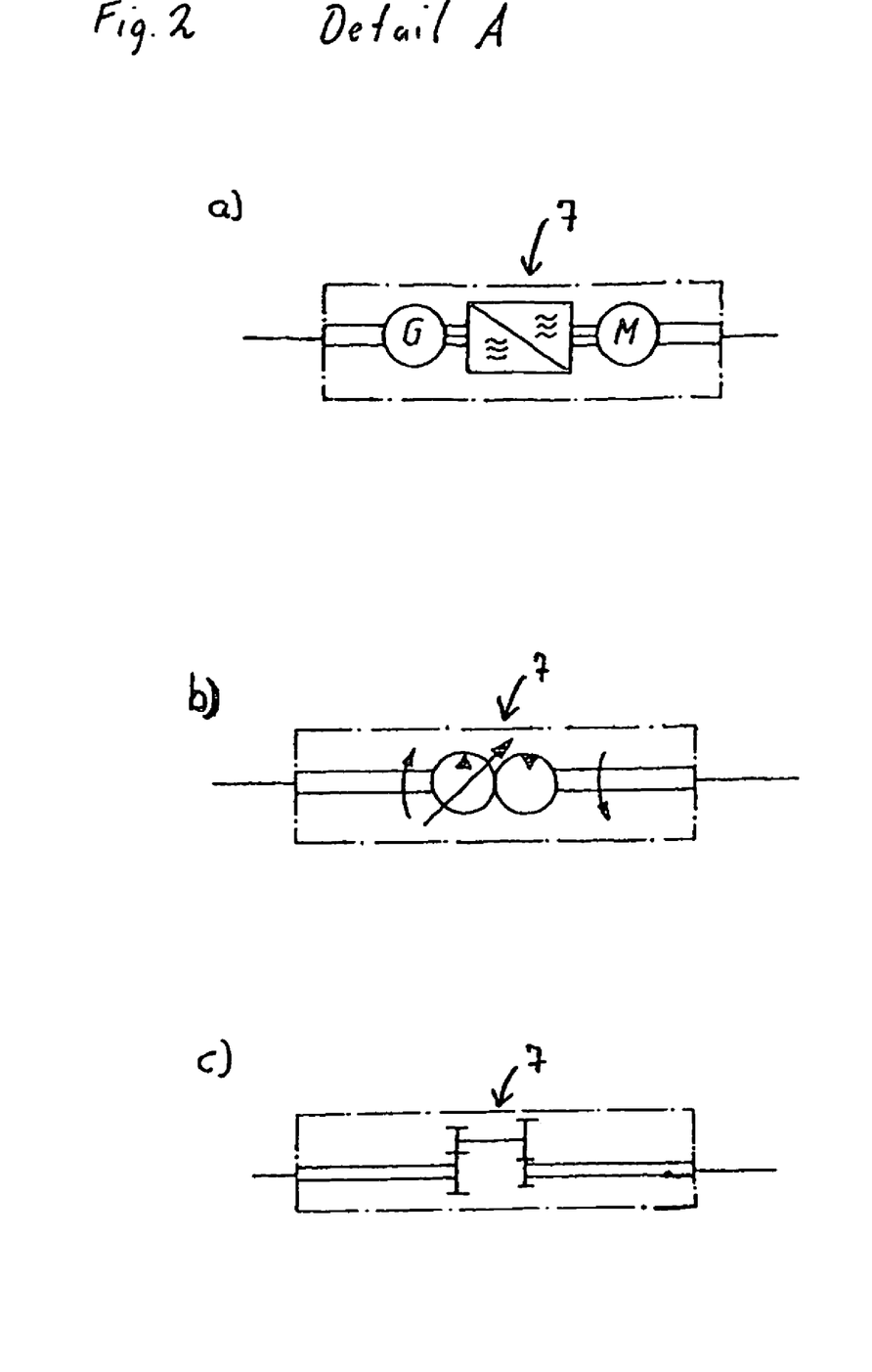
FIGS. 2a to c show three different embodiments of detail A according to the invention from FIG. 1.

FIGS. 2a to 2c present three different embodiments of the energy-recovery device 7 according to detail A in FIG. 1. The energy-recovery device 7 recovers the extracted and converted energy to the pumping device 5. FIG. 2a presents an energy-recovery device 7 with energy recovery via an electromechanical gear drive and with an inverter. FIG. 2b presents an energy-recovery device 7 with a hydraulic gear drive. FIG. 2c presents an energy-recovery device 7 with a mechanical gear drive. The respective drive ends of the energy-recovery devices 7 are each connected to the energy converter 6, the output ends of the respective energy-recovery devices 7 being connected to the pumping device 5.

Figure 3:
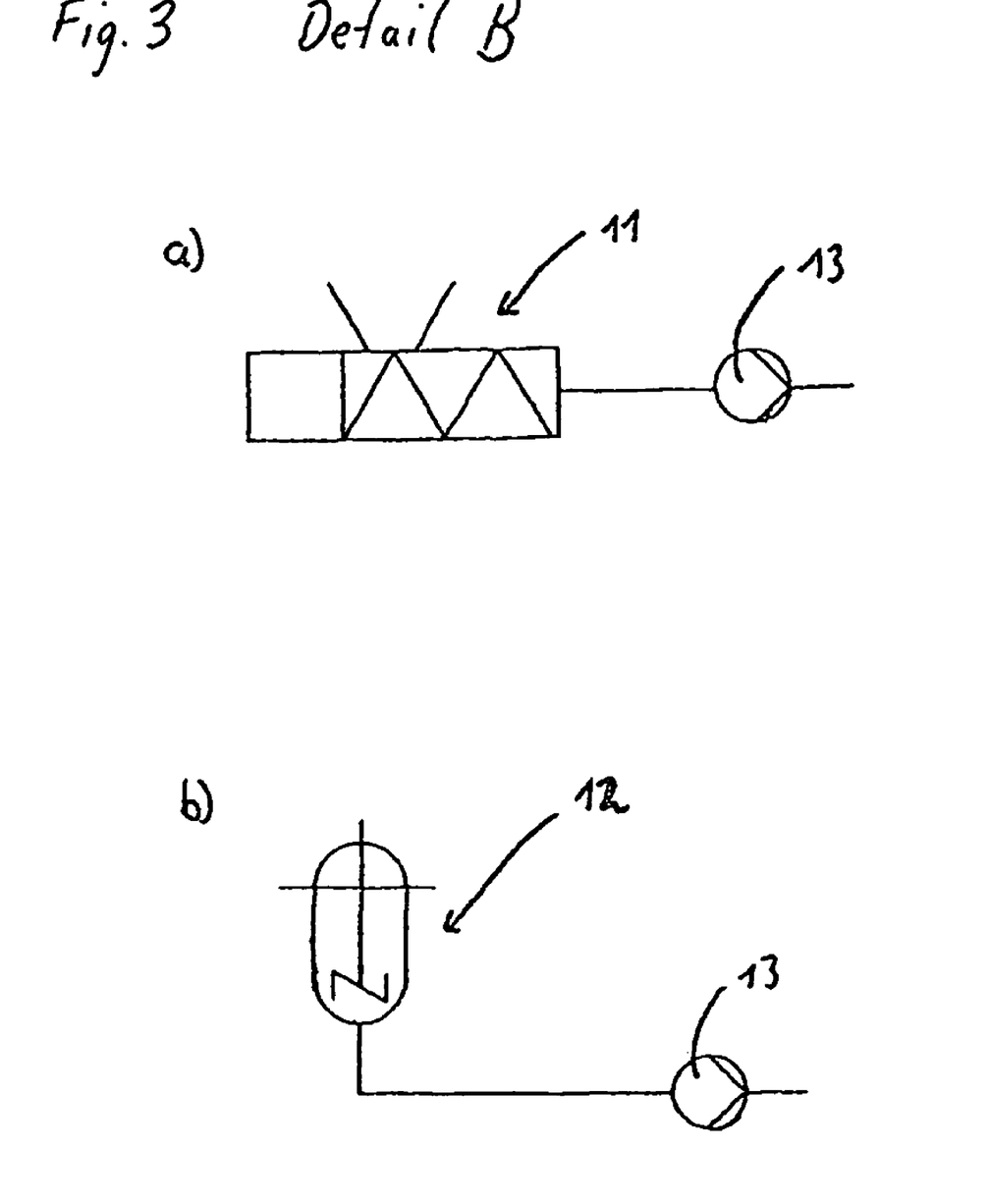

FIG. 3 presents two different embodiments of a plastic-melt supply arrangement according to detail B in FIG. 1. FIG. 3a presents a plastic-melt supply arrangement with an extruder 11 with drive, wherein the melt is supplied via a melt pump 13 onward to the chopping device 3 in FIG. 1. FIG. 3b presents a reactor 12 from which the melt is supplied via a melt pump 13 to the chopping device 3 from FIG. 1.

Figure 4:
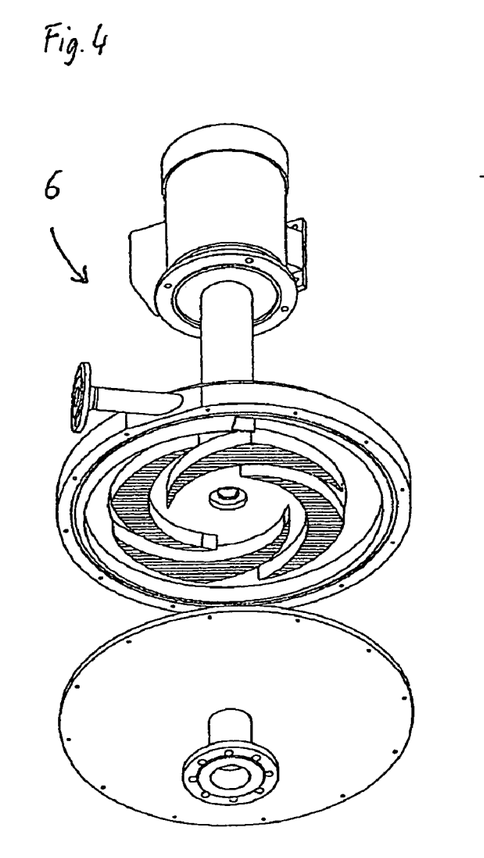
FIG. 4 shows a first embodiment of an energy converter according to the invention.

FIG. 4 presents an embodiment of an energy converter 6 according to the invention, said energy converter 6 being in the form of a turbine, in a perspective, partially exploded view. The process fluid 4 with the therein contained granules is supplied via a tangential inlet to the turbine. The turbine housing accommodates an impeller with impeller vanes, the process fluid with the therein contained granules being carried radially inwards and being discharged via an axial outlet in a housing cover of the turbine. As it passes through the turbine according to FIG. 4, the process fluid 4 with the therein contained granules transmits pressure energy by momentum transfer to the impeller vanes of the impeller of the turbine, thereby driving the impeller and thus the output of the turbine, with the result that the pressure of the process fluid 4 with the therein contained granules is reduced and at least some of the extracted energy is converted according to the invention into a reusable form of energy.

Figure 5:
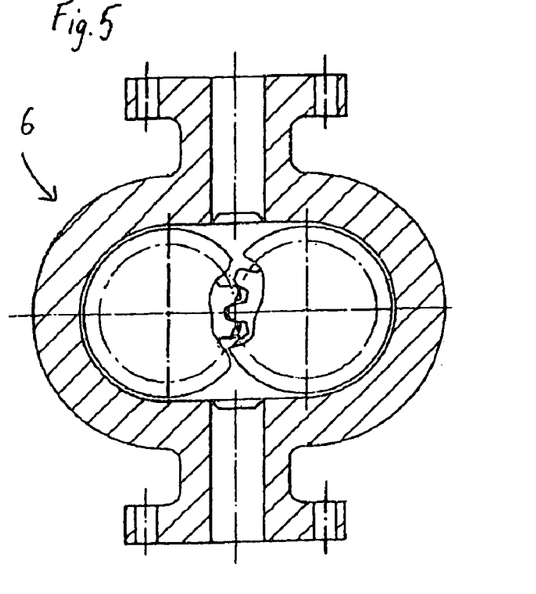
FIG. 5 shows a second embodiment of an energy converter according to the invention.

FIG. 5 presents a further preferred embodiment of an energy converter 6 according to the invention, namely a sectional view of a gear pump. According to the invention, the gear pump has a reverse energy flow direction, i.e. it is actually not used as a pump, but, as it flows through the gear pump, the pressure of the process fluid with the therein contained granules sets said pump in motion, where said motion, i.e. the rotational motion of the corresponding gearwheels of the gear pump, is then reusable.

Figure 6:
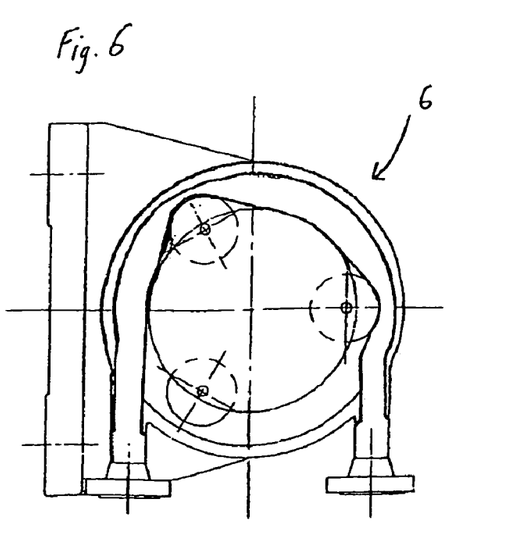
FIG. 6 shows a third embodiment of the energy converter according to the invention.

FIG. 6 presents a further preferred embodiment of an energy converter 6 according to the invention, namely a flexible-tube pump with reverse energy flow direction, which flexible-tube pump was already described hereinbefore.

Figure 7:
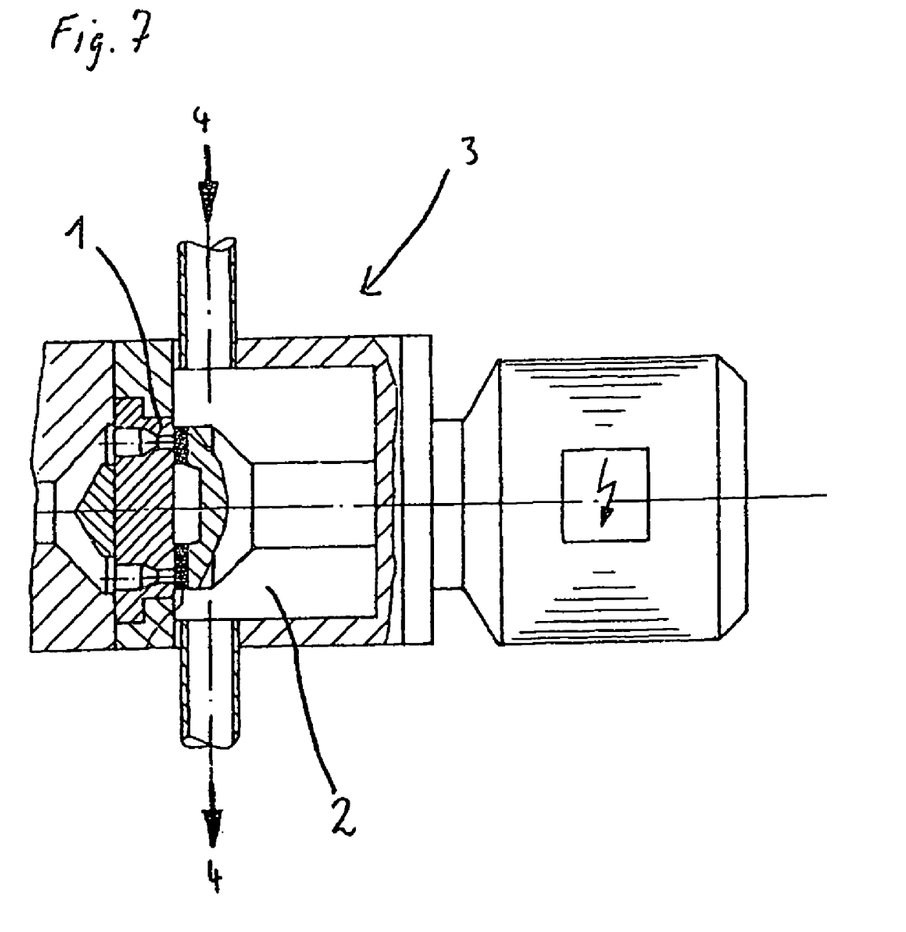
FIG. 7 shows a detail view of a chopping device according to an embodiment of the invention.

FIG. 7 presents an embodiment of a chopping device 3 in a partially cut-away side elevation view. A plastic melt is supplied via a perforated plate 1 to a process chamber 2. Process fluid flows into the process chamber from above, indicated by an arrow in FIG. 7, at a pressure that is above the ambient pressure. The process chamber is completely filled with process fluid 4. The process fluid 4 with the therein contained granules is discharged from the process chamber 2 via an outlet. The flow direction of the process fluid is presented by arrows in FIG. 7. The chopping device 3 further has a cutter head which is connected by a shaft to an electric motor, whereby the strands of the plastic melt extruded into the process chamber 2 are chopped into individual granules.

The device according to the invention, the process according to the invention and the corresponding application according to the invention provide a simple and cost-effective means of safely guaranteeing the reliable production of pellets under all operating conditions.

What is claimed is:

1. Device for producing pellets from a plastic melt by extrusion, comprising a perforated plate (1) from which the plastic melt is extruded at a pressure above the ambient pressure; a process chamber (2) into which the plastic melt is extruded; a chopping device (3) for chopping strands of the plastic melt extruded from the perforated plate into individual granules, the process chamber (2) being filled with a process fluid (4); and a pumping device (5) which supplies the process fluid (4) to the process chamber (2) at a pressure above the ambient pressure, the pressure of the process fluid (4) with the therein contained granules being reduced downstream of the process chamber (2), characterized in that an energy converter (6) is provided downstream of the process chamber (2), wherein said energy converter (6) extracts at least some of the pressure energy from the process fluid (4) with the therein contained granules, reduces the pressure of the process fluid (4) with the therein contained granules and converts at least some of the extracted energy into a reusable form of energy.

2. Device according to claim 1, characterized in that the energy converter (6) is a turbine.

3. Device according to claim 2, characterized in that there is essentially no stationary constriction of a flow cross-section downstream of the process chamber (2).

4. Device according to claim 2, characterized in that an energy-recovery device (7) is provided by means of which the extracted and converted energy can be recovered to the pumping device (5).

5. Device according to claim 1, characterized in that the energy converter (6) is a flexible-tube pump with reverse energy flow direction.

6. Device according to claim 5, characterized in that a pipe for the process fluid has a damping element (15) for damping and compensating pulsations, having preferably an air chamber.

7. Device according to claim 6, characterized in that there is essentially no stationary constriction of a flow cross-section downstream of the process chamber (2).

8. Device according to claim 5, characterized in that there is essentially no stationary constriction of a flow cross-section downstream of the process chamber (2).

9. Device according to claim 5, characterized in that an energy-recovery device (7) is provided by means of which the extracted and converted energy can be recovered to the pumping device (5).

10. Device according to claim 1, characterized in that the energy converter (6) is a gear pump with reverse energy flow direction.

11. Device according to claim 10, characterized in that there is essentially no stationary constriction of a flow cross-section downstream of the process chamber (2).

12. Device according to claim 1, characterized in that there is essentially no stationary constriction of a flow cross-section downstream of the process chamber (2).

13. Device according to claim 1, characterized in that an energy-recovery device (7) is provided by means of which the extracted and converted energy can be recovered to the pumping device (5).

14. Device according to claim 13, characterized in that the energy-recovery device (7) provides for mechanical, electrical, pneumatic or hydraulic energy recovery or a combination thereof.

15. Device according to claim 1, characterized in that a control loop (14) is provided by means of which the pressure in the process chamber (2) is adjustable such that said pressure is slightly above, preferably just above, the pressure at which the process fluid (4) evaporates at the prevailing temperature.

16. Device according to claim 1, characterized in that a control loop (14) is provided by means of which the pressure in the process chamber (2) is adjustable such that said pressure is slightly above, preferably just above, the pressure at which attendant substances contained in the plastic melt evaporate at the prevailing temperature.

17. Application of a device for producing pellets from a plastic melt according to claim 1, characterized in that a plastic melt with attendant substances is processed therewith, which attendant substances will outgas unless there is a sufficient pressure above the ambient pressure in a melt supply arrangement and/or in the process chamber.

18. Application according to claim 17, characterized in that the plastic melt with attendant substances is expanded polystyrene (EPS).

19. Process for producing pellets from a plastic melt by extrusion, a plastic melt being produced, the plastic melt being extruded at a pressure above the ambient pressure through a perforated plate into a process chamber filled with a process fluid; strands of the plastic melt extruded from the perforated plate being chopped by a chopping device into individual granules, a pumping device supplying the process fluid to the process chamber at a pressure above the ambient pressure; and the pressure of the process fluid with the therein contained granules being reduced downstream of the process chamber, characterized in that at least some of the pressure energy is extracted from the process fluid with the therein contained granules by an energy converter provided downstream of the process chamber, the pressure of the process fluid with the therein contained granules being reduced and at least some of the extracted energy being converted into a reusable form of energy.

20. Process according to claim 19, characterized in that the extracted and converted energy is recovered to the pumping device through an energy-recovery device.

* * * * *